US012720622B2

(12) United States Patent
Chong

(10) Patent No.: US 12,720,622 B2
(45) Date of Patent: Aug. 25, 2026

(54) DATA TRANSMISSION METHOD, TERMINAL, AND NETWORK SIDE DEVICE

(71) Applicant: VIVO MOBILE COMMUNICATION CO., LTD., Dongguan (CN)

(72) Inventor: Weiwei Chong, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 271 days.

(21) Appl. No.: 18/674,174

(22) Filed: May 24, 2024

(65) Prior Publication Data

US 2024/0314862 A1 Sep. 19, 2024

Related U.S. Application Data

(63) Continuation of application No. PCT/CN2022/133756, filed on Nov. 23, 2022.

(30) Foreign Application Priority Data

Nov. 25, 2021 (CN) ......................... 202111417182.9

(51) Int. Cl.
*H04W 76/12* (2018.01)
*H04B 17/382* (2015.01)
(Continued)

(52) U.S. Cl.
CPC .......... *H04W 76/12* (2018.02); *H04B 17/382* (2015.01); *H04W 28/0268* (2013.01); *H04W 28/0917* (2020.05)

(58) Field of Classification Search
CPC ...... H04B 17/382; H04W 76/12; H04W 4/38; H04W 28/0268; H04W 28/0917; H04W 76/11
See application file for complete search history.

(56) References Cited

U.S. PATENT DOCUMENTS 11,665,602 B2 * 5/2023 Ahmavaara ..... H04W 36/00835 370/331
12,089,182 B2 * 9/2024 Wu ....................... H04W 68/02
(Continued)

FOREIGN PATENT DOCUMENTS

CN 110557724 A 12/2019
CN 112437122 A 3/2021
(Continued)

OTHER PUBLICATIONS

3rd Generation Partnership Project, Technical Specification Group Radio Access Network; Evolved Universal Terrestrial Radio Access (E-UTRA); Radio Resource Control (RRC); Protocol specification (Release 11), 3 GPP TS 36.331, Dec. 2016, V11.17.0.

*Primary Examiner* — Syed Ali
(74) *Attorney, Agent, or Firm* — The Webb Law Firm

(57) ABSTRACT

A data transmission method includes receiving, by a radio access network (RAN), a first sensing service control message sent by a first network element, where the first sensing service control message includes at least tunnel information of the first network element; and establishing, by the RAN, a sensing service shared channel, where the sensing service shared channel corresponds to the tunnel information of the first network element, and the sensing service shared channel is used for transmitting at least one piece of sensing measurement data corresponding to a first sensing service.

20 Claims, 9 Drawing Sheets

(51) Int. Cl.
*H04W 28/02* (2009.01)
*H04W 28/08* (2023.01)

(56) References Cited

U.S. PATENT DOCUMENTS

| | | | | |
|---|---|---|---|---|
| 12,349,215 | B2 * | 7/2025 | Xu | H04W 36/02 |
| 2019/0191330 | A1 | 6/2019 | Dao et al. | |
| 2020/0128451 | A1 | 4/2020 | Hou et al. | |
| 2023/0062526 | A1 | 3/2023 | Xiong | |
| 2023/0319616 | A1 * | 10/2023 | Lunardi | H04W 28/0284 370/329 |
| 2024/0179792 | A1 * | 5/2024 | Höglund | H04W 76/28 |
| 2024/0214892 | A1 * | 6/2024 | Liu | H04W 36/008355 |
| 2024/0381209 | A1 * | 11/2024 | Spapis | H04W 36/087 |
| 2024/0414759 | A1 * | 12/2024 | Rune | H04W 36/22 |

FOREIGN PATENT DOCUMENTS

| | | | |
|---|---|---|---|
| CN | 112449375 | A | 3/2021 |
| CN | 112738758 | A | 4/2021 |
| KR | 1020200027336 | A | 3/2020 |
| WO | 2018228165 | A1 | 12/2018 |

* cited by examiner

600

S610

In a case that a sensing service request message sent by a consumer device is received, a first network element sends a first sensing service control message to a RAN according to the sensing request message

DATA TRANSMISSION METHOD, TERMINAL, AND NETWORK SIDE DEVICE

CROSS-REFERENCE TO RELATED APPLICATIONS

This application is a Bypass Continuation Application of International Patent Application No. PCT/CN2022/133756, filed Nov. 23, 2022, and claims priority to Chinese Patent Application No. 202111417182.9, filed Nov. 25, 2021, the disclosures of which are hereby incorporated by reference in their entireties.

BACKGROUND OF THE INVENTION

Field of the Invention

This application pertains to the field of wireless communication technologies, and specifically, relates to a data transmission method, a terminal, and a network-side device.

Description of Related Art

In addition to communication capacities, future mobile communication systems, such as Beyond 5th Generation (B5G) systems and 6G systems, will also have sensing capacities. The "sensing capacity" can be understood as follows: one or more devices with sensing capacities can perform monitoring, tracking, identification, imaging, and the like on objects, events, environments, or the like through transmission and reception of wireless signals.

Generally, for a same sensing service, if multiple sensing devices with sensing capacities (for example, sensing signal sending devices or multiple sensing signal measurement devices) are used, multiple transmission channels need to be separately established for the multiple different sensing devices to transmit sensing measurement data, leading to problems such as transmission channel redundancy and waste of resources.

SUMMARY OF THE INVENTION

According to a first aspect, a data transmission method is provided. The method includes: receiving, by a radio access network (RAN), a first sensing service control message sent by a first network element, where the first sensing service control message includes at least tunnel information of the first network element; and establishing, by the RAN, a sensing service shared channel, where the sensing service shared channel corresponds to the tunnel information of the first network element, and the sensing service shared channel is used for transmitting at least one piece of sensing measurement data corresponding to a first sensing service.

According to a second aspect, a data transmission method is provided. The method includes: in a case that a sensing service request message is received sent by a consumer device, sending, by a first network element, a first sensing service control message in response to the sensing service request message to a radio access network (RAN), where the first sensing service control message includes at least tunnel information of the first network element; where the first sensing service control message is used to instruct the RAN to establish a sensing service shared channel, where the sensing service shared channel corresponds to the tunnel information of the first network element, and the sensing service shared channel is used for transmitting at least one piece of sensing measurement data corresponding to a first sensing service.

According to a third aspect, a data transmission method is provided. The method includes: receiving, by a sensing signal measurement device, a third sensing service control message sent by a first network element, where the third sensing service control message is used for establishing a first sensing service; performing, by the sensing signal measurement device, measurement on a sensing signal based on the third sensing service control message to obtain at least one piece of sensing measurement data, where the sensing signal corresponds to the first sensing service; and sending, by the sensing signal measurement device, the at least one piece of sensing measurement data to a radio access network (RAN).

According to a fourth aspect, a data transmission apparatus is provided. The apparatus includes: a first transmission module, configured to receive a first sensing service control message sent by a first network element, where the first sensing service control message includes at least tunnel information of the first network element; and a processing module, configured to establish a sensing service shared channel, where the sensing service shared channel corresponds to the tunnel information of the first network element, and the sensing service shared channel is used for transmitting at least one piece of sensing measurement data corresponding to a first sensing service.

According to a fifth aspect, a data transmission apparatus is provided. The apparatus includes: a second transmission module, configured to: in a case that a sensing service request message sent by a consumer device is received, send a first sensing service control message in response to the sensing service request message to a radio access network (RAN), where the first sensing service control message includes at least tunnel information of the first network element; where the first sensing service control message is used to instruct the RAN to establish a sensing service shared channel, where the sensing service shared channel corresponds to the tunnel information of the first network element, and the sensing service shared channel is used for transmitting at least one piece of sensing measurement data corresponding to a first sensing service.

According to a sixth aspect, a data transmission apparatus is provided. The apparatus includes: a third transmission module, configured to receive a third sensing service control message sent by a first network element, where the third sensing service control message is used for establishing a first sensing service; and a measurement module, configured to perform measurement on a sensing signal based on the third sensing service control message to obtain at least one piece of sensing measurement data, where the sensing signal corresponds to the first sensing service; where the third transmission module is further configured to send the at least one piece of sensing measurement data to a radio access network (RAN).

According to a seventh aspect, a terminal is provided. The terminal includes a processor, a memory, and a program or instructions stored in the memory and executable on the processor. When the program or instructions are executed by the processor, the steps of the method according to the third aspect are implemented.

According to an eighth aspect, a terminal is provided including a processor and a communication interface. The communication interface is coupled to the processor, and the processor is configured to run a program or instructions to implement the steps of the method according to the third aspect or the steps of the method according to the third aspect.

According to a ninth aspect, a network-side device is provided. The network-side device includes a processor, a memory, and a program or instructions stored in the memory and executable on the processor. When the program or instructions are executed by the processor, the steps of the method according to the first aspect, the second aspect, or the third aspect are implemented.

According to a tenth aspect, a network-side device is provided including a processor and a communication interface. The communication interface is coupled to the processor, and the processor is configured to run a program or instructions to implement the steps of the method according to the first aspect, the second aspect, or the third aspect are implemented.

According to an eleventh aspect, a non-transitory readable storage medium is provided. The non-transitory readable storage medium stores a program or instructions, and when the program or the instructions are executed by a processor, the steps of the method according to the first aspect are implemented, the steps of the method according to the second aspect are implemented, or the steps of the method according to the third aspect are implemented.

According to a twelfth aspect, a chip is provided. The chip includes a processor and a communication interface, the communication interface is coupled to the processor, and the processor is configured to run a program or instructions to implement the steps of the method according to the first aspect, the steps of the method according to the second aspect, or the steps of the method according to the third aspect.

According to a thirteenth aspect, a computer program product/program product is provided. The computer program product/program product is stored in a non-transient storage medium, and the computer program product/program product is executed by at least one processor to implement the steps of the method according to the first aspect, the steps of the method according to the second aspect, or the steps of the method according to the third aspect.

According to a fourteenth aspect, a sensing service system is provided and includes a terminal and a network-side device. The terminal can be configured to perform the steps of the data transmission method according to the third aspect, and the network-side device can be configured to perform the steps of the data transmission method according to the first, second, or third aspects.

DESCRIPTION OF THE INVENTION

The following clearly describes the technical solutions in embodiments of this application with reference to the accompanying drawings in the embodiments of this application. Apparently, the described embodiments are some but not all embodiments of this application. All other embodiments obtained by persons of ordinary skill in the art based on the embodiments of this application shall fall within the protection scope of this application.

The terms “first”, “second”, and the like in the specification and claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, “first”, “second”, and the like are usually used to distinguish objects of a same type and do not limit the quantity of objects. For example, there may be one or a plurality of first objects. In addition, “and/or” in the specification and claims represents at least one of connected objects, and the character “/” generally indicates that the contextually associated objects have an “or” relationship.

It should be noted that technologies described in the embodiments of this application are not limited to a long term evolution (LTE) or LTE-Advanced (LTE-A) system, and may also be applied to other wireless communication systems, for example, code division multiple access (CDMA), time division multiple access (TTDMA), frequency division multiple access (FDMA), orthogonal frequency division multiple access (OFDMA), single-carrier frequency-division multiple access (SC-FDMA), and other systems. The terms “system” and “network” are often used interchangeably in the embodiments of this application. The technologies described may be used in the above-mentioned systems and radio technologies as well as other systems and radio technologies. In the following descriptions, a new radio (NR) system is described for an illustration purpose, and NR terms are used in most of the following descriptions, although these technologies may also be applied to other communication systems than an NR system application, for example, the 6th generation (6G) communication system.

Figure 1A:
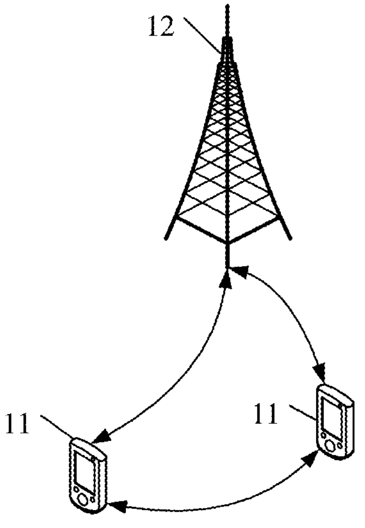
FIG. 1A is a schematic structural diagram of a wireless communication system according to an example embodiment of this application.

FIG. 1A is a block diagram of a wireless communication system to which the embodiments of this application can be applied. The wireless communication system includes a terminal 11 and a network-side device 12. The terminal 11 may be a terminal-side device, such as a mobile phone, a tablet personal computer, a laptop computer or a notebook computer, a personal digital assistant (PDA), a palmtop computer, a netbook, an ultra-mobile personal computer (UMPC), a mobile Internet device (MID), an augmented reality (AR)/virtual reality (VR) device, a robot, a wearable device, vehicle user equipment (VUE), or pedestrian user equipment (PUE), a smart appliance (a home appliance with a wireless communication function, for example, a refrigerator, a television, a washing machine, or furniture), a game console, a personal computer (PC), a teller machine, or a self-service machine. The wearable device includes a smart watch, a smart band, a smart earphone, smart glasses, smart jewelry (a smart bangle, a smart bracelet, a smart ring, a smart necklace, a smart ankle bangle, a smart anklet, or the like), a smart wristband, smart clothing, or the like. It should be noted that the terminal 11 is not limited to a specific type in the embodiments of this application. The network-side device 12 may include an access network device or a core network device. The access network device 12 may also be referred to as a radio access network device, a radio access network (RAN), a radio access network function, or a radio access network unit. The access network device 12 may include a base station, a WLAN access point, a Wi-Fi node, or the like. The base station may be referred to as a NodeB, an evolved NodeB (eNB), an access point, a base transceiver station (BTS), a radio base station, a radio transceiver, a basic service set (BSS), an extended service set (ESS), a home NodeB, a home evolved NodeB, a transmission and reception point (TRP), or other appropriate terms in the art. Provided that the same technical effects are achieved, the base station is not limited to any specific technical term. It should be noted that in the embodiments of this application, only the base station in the NR system is used as an example for description, although the specific type of the base station is not limited.

Figure 1B:
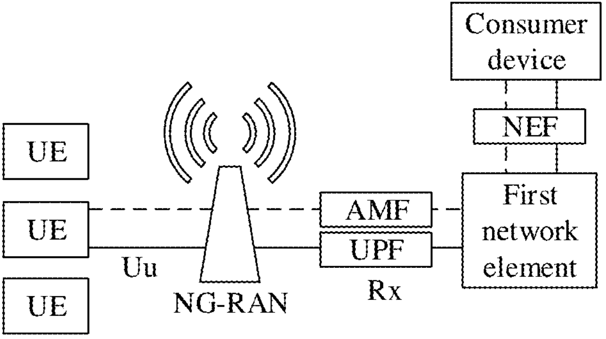
FIG. 1B is a schematic structural diagram of a sensing service system according to an example embodiment of this application.

On the basis of the wireless communication system, as shown in FIG. 1B, this application further provides a network architecture of a sensing service system. The sensing service system includes multiple UEs, a radio access network (RAN), an access and mobility management function (AMF), a user plane function (UPF), a first network element, a network exposure function (NEF), and a consumer device.

The multiple UEs may be sensing signal measurement devices or sensing signal sending devices. This is not limited herein.

The RAN can act as a transmission node and also act as a sensing signal measurement device or a sensing signal sending device. It should be noted that the sensing service system can include one or more sensing signal sending devices and one or more sensing signal measurement devices corresponding to one sensing service.

The first network element is introduced to support the sensing service. In other words, the first network element can be understood as a sensing function (SF).

In this application, the first network element can interact directly or indirectly with the sensing devices (including sensing signal sending devices and sensing signal measurement devices) to exchange signaling and/or sensing service data corresponding to the sensing service.

In addition, the first network element can process or analyze obtained sensing service data (such as sensing measurement data) to provide a sensing service processing result or sensing service analysis result to a consumer of the sensing service.

The consumer device may be a terminal device, a network element inside a network, a network management device, or a third-party service function (such as application function (AF)), or the like.

It can be understood that depending on different sensing service scenarios, the network architecture of the sensing service system provided in this application can include but is not limited to those shown in FIG. 1B, for example, having more or fewer network elements than shown in FIG. 1B. This is not limited herein.

Based on the description of the sensing service system, the technical solutions provided in the embodiments of this application are detailed below with reference to the accompanying drawings through some examples and application scenarios thereof.

Figure 2:
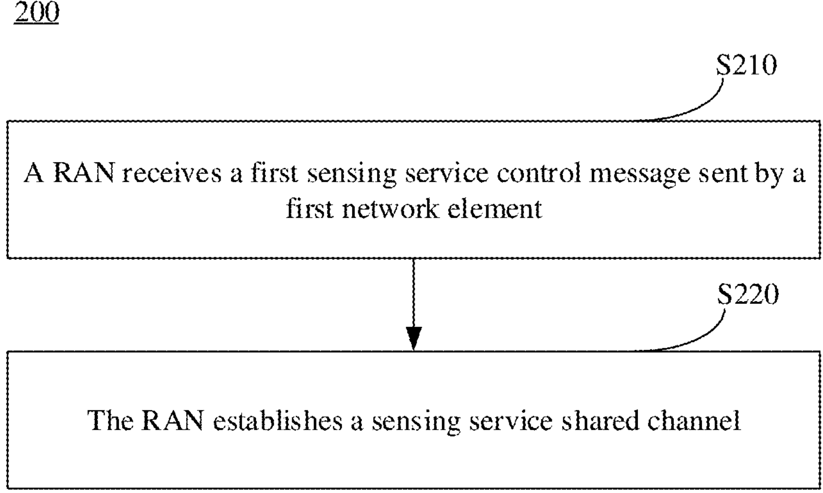
FIG. 2 is a first schematic flowchart of a data transmission method according to an example embodiment of this application.

FIG. 2 is a schematic flowchart of a data transmission method 200 according to an example embodiment of this application. This method 200 can be, but is not limited to, executed by a radio access network (such as an NG-RAN), and may be executed by hardware and/or software installed in the radio access network. In this embodiment, the method 200 can include at least the following steps.

S210. A RAN receives a first sensing service control message sent by a first network element.

The first sensing service control message may be sent by the first network element to the radio access network after the first network element has received a sensing service request message sent by a consumer device (such as an AF), so as to instruct the RAN to establish a sensing service shared channel (which can also be understood as a common tunnel) corresponding to the first sensing service. The first sensing service may be a target detection service, a target tracking service, a target imaging service, or the like.

In a possible implementation, the consumer device may send the sensing service request message to the first network element via an NEF or not via an NEF. As shown in FIG. 1B, in a case of using an NEF, the consumer device may first send the sensing service request message to an AMF, and then the AMF forwards the sensing service request message to the first network element. Alternatively, the consumer device may directly send the sensing service request message to the first network element, without using an AMF. This is not limited herein.

Optionally, considering that the sensing service request message is used to request the first network element to perform the first sensing service, including establishing the sensing service shared channel corresponding to the first sensing service, the sensing service request message may include description information of the first sensing service, a target area and target user information of the first sensing service, and the like.

It can be understood that the description information of the first sensing service is used to describe the first sensing service. For example, in this embodiment, the description information of the first sensing service may include at least one of the following (11) to (18).

(11) Type of the first sensing service

The type of the first sensing service may be defined by physical sensing range and/or delay-critical requirement of the first sensing service. For example, the type of the first sensing service may include but is not limited to: type (Type) I: large scale sensing (LSS) range and high delay-critical requirement; type II: LSS range and low delay-critical requirement; type III: small scale sensing (SSS) range and high delay-critical requirement; type IV: SSS and low delay-critical requirement; and so on.

(12) Sensing quantity. The sensing quantity can also be understood as sensing measurement data required by the consumer device. For example, the sensing quantity may include but is not limited to a position of a sensing object, a distance of the sensing object, a moving speed of the sensing object, imaging of the sensing object, a motion trajectory of the sensing object, texture analysis of the sensing object, material analysis of the sensing object, and the like.

(13) Purpose or application of the first sensing service, for example, the first sensing service is used for target tracking, target detection, and the like.

(14) Granularity of the first sensing service, such as per user equipment (per UE), per user group, or per area.

(15) Sensing service time, where the sensing service time is used to define time information of execution of the first sensing service.

(16) Reporting information of the sensing measurement data, where the reporting information of the sensing measurement data is used to define a reporting condition, a reporting time, a reporting format, and a reporting frequency of the sensing measurement data.

(17) Quality of service (QOS) requirement (or sensing indicator) of the first sensing service.

The quality of service of the first sensing service includes but is not limited to at least one of sensing accuracy, sensing error, maximum sensing range, sensing delay, detection probability, false alarm probability, sensing priority level, and sensing signal quality.

Optionally, the sensing accuracy may include distance resolution, imaging resolution, moving speed resolution, angle resolution, or the like.

The sensing error may include distance error, imaging error, moving speed error, or the like.

(18) Service range information of the first sensing service.

The service range information is used to specify the execution of the first sensing service for the sensing service object within the sensing service range. Optionally, the sensing service range may be a relative position range (such as within 20 meters) or an absolute position range, such as one or more tracking area identity (TAI(s)), one or more cell identities (cell ID(s)), one or more area IDs (such as Tian'anmen Square in Beijing).

Further, in response to the sensing service request message, the first network element may select a sensing device to serve the first sensing service, for example, one or more sensing signal sending devices, or one or more sensing signal measurement devices.

In addition, the first network element may further obtain target policy information for the first sensing service in response to the sensing service request message, where the target policy information includes policy information of sensing quality of service (sensing QoS) and/or policy information of transmission quality of service, so as to ensure that the subsequent execution of the first sensing service (such as service measurement) can meet the sensing quality of service requirements, thereby ensuring the sensing quality of service.

In this embodiment, the policy information of sensing quality of service is used to indicate a sensing service-related resource and/or sensing execution policy allocated by a communication network (or may be understood as the foregoing sensing service network) for the first sensing service.

Optionally, the policy information of sensing quality of service may include but is not limited to one or more of sensing priority level, sensing delay budget (SDB), sensing resolution (SR), maximum sensing range (MSR), sensing error (SE), continuous sensing capacity (CSC), sensing update rate, sensing signal quality, sensing security, sensing privacy, detection probability, false alarm probability, and the like.

For ease of understanding, related information of parameters that the policy information of sensing quality of service may include is shown in Table 1.

TABLE 1

| Parameter | Meaning | Sub-parameters | Remarks |
|---|---|---|---|
| Sensing priority level | Used to determine a resource scheduling priority of a sensing QoS flow (Flow). | | This parameter can also be used to distinguish between sensing QoS flows of a terminal and distinguish between sensing QoS flows of different terminals. A smaller parameter indicates a higher the priority. |
| Sensing delay budget | Used to define a maximum sensing delay of a sensing service and quantitatively describe the delay-critical requirement of a sensing service. | | This parameter is generally measured in unit of millisecond (ms). A smaller value indicates a higher delay-critical requirement of the sensing service. |
| Sensing resolution | Used to define fineness of a sensing service, which is related to the network hardware device and resource | Distance resolution, speed resolution, angle resolution, imaging resolution, temperature | Different sensing services have different sensing resolutions. |

TABLE 1-continued

| Parameter | Meaning | Sub-parameters | Remarks |
|---|---|---|---|
| | configuration. For this factor, configuration resources vary with different sensing services. For example, the distance resolution is related to the sensing signal bandwidth configured, and the angle resolution is related to the aperture of the base station or terminal antenna. | resolution, atmospheric pressure resolution, humidity resolution, and the like. | |
| Maximum sensing range | Used to define a maximum measurement range of a sensing measurement quantity supported for a sensing service. | Maximum sensing distance, maximum sensing speed, maximum sensing angle, maximum sensing temperature, maximum sensing pressure, maximum sensing humidity, and the like. | Different sensing services have different maximum sensing limits. |
| Sensing error | Used to define sensing performance of a sensing service, that is, sensing accuracy, which is related to the network hardware device, resource configuration, and SNR. The sensing error can be defined from one of the following three aspects: (1) maximum error; (2) maximum error as a percentage of the true value (relative maximum error); and (3) relative error distribution. | | The sensing error is different from the sensing resolution. The former defines the maximum deviation between the true sensing value and the actual sensing result, and the latter defines the sensing accuracy requirement of different sensing services. |
| Continuous sensing capacity | Used to define the capacity of a sensing service in supporting continuous sensing, and mainly divided into single sensing and continuous sensing (such as target tracking, scanning imaging). | | Probably not applicable to some sensing services. |
| Sensing update rate | Used to define a result update rate of sensing processing of a service requiring continuous sensing. | Distance update rate, speed update rate, angle update rate, imaging update rate, temperature update rate, atmospheric pressure update rate, humidity update rate, and the like. | Applicable to sensing services that require continuous sensing |
| Sensing signal quality | Used to define sensing signal quality required by a sensing service. Different sensing services have different requirements. | Received signal strength, signal-to-noise ratio, signal-to-interference noise ratio, signal-to-clutter ratio, signal sidelobe characteristics, and peak-to-average power ratio (PAPR) of the sensing signal. | |
| Sensing security | Used to define security requirements of different sensing services and divided into three levels. | | Depending on added services or refinement of service security levels in the future, the three |

TABLE 1-continued

| Parameter | Meaning | Sub-parameters | Remarks |
|---|---|---|---|
| | | | levels can be expanded to more than three levels. |
| Sensing privacy | Used to define privacy requirements of different sensing services and divided into three levels. | | Depending on added services or refinement of service privacy levels in the future, the three levels can be expanded to more than three levels. |
| Detection probability | Defined as the capability to determine whether a sensing target is present or not, that is, the probability of determining a target to be present in a case that the target is assumed to be present. | | Only applicable to some services, such as radar sensing services |
| False alarm probability | Defined as the capability to determine whether a sensing target is present or not, that is, the probability of determining a target to be present in a case that the target is assumed to be absent. | | Only applicable to some services, such as radar sensing services |
| . . . | . . . | . . . | . . . |

Policy information of transmission quality of service (QOS) is used to indicate a communication transmission resource and/or communication transmission policy allocated by a communication network to the first sensing service, for example, 5G QoS parameters defined in 3GPP TS 23.501, (such as 5G QoS identifier (5G QoS Identifier, 5QI), and allocation and retention priority (ARP).

Certainly, in this embodiment, in a possible implementation, the first network element may obtain the target policy information in the following manner 1 and/or manner 2.

Manner 1. The first network element sends a policy request message to a policy control function (PCF) to obtain the target policy information from the PCF.

Optionally, the policy request message is determined by the first network element based on the first sensing service control message received. In view of this, the policy request message may include at least one of the following (21) to (24):

(21) description information of the first sensing service; and

(22) target area of the first sensing service;

(23) information about a target user of the first sensing service; or

(24) identification information of a sensing device, where the sensing device includes a sensing signal sending device and/or a sensing signal measurement device.

Manner 2. The first network element generates the target policy information. The rule for generating the target policy information by the first network element can be specified by a protocol, configured by the higher layer, or the like. This is not limited herein.

In addition, in addition to obtaining the target policy information, the first network element can also establish a sensing session corresponding to the first sensing service in response to the sensing service request message, and/or send a sensing resource configuration message to the sensing signal sending device (such as the RAN or user equipment) in response to the sensing service request message.

That the first network element establishes a sensing session corresponding to the first sensing service in response to the sensing service request message can be understood as follows: the first network element allocates a corresponding first sensing session identifier (SSID) for the first sensing service, so as to subsequently obtain, transmit, and analyze the sensing measurement data, modify the first sensing service, and delete the first sensing service based on this first SSID.

It should be noted that the order of obtaining the target policy information and establishing the sensing session corresponding to the first sensing service by the first network element is not limited. That is, the first network element may first obtain the target policy information and then establish the sensing session corresponding to the first sensing service; or first establish the sensing session corresponding to the first sensing service and then obtain the target policy information. This is not limited herein.

The sensing resource configuration message sent by the first network element to the sensing signal sending device (such as the RAN or user equipment) in response to the sensing service request message is used for the sensing signal sending device to perform corresponding resource configuration, so that the sensing signal sending device can send a sensing signal according to the resource configuration corresponding to the sensing resource configuration message, for example, sending a sensing signal in a specific spectrum, specific modulation scheme, synchronization period, and the like.

Optionally, the sensing resource configuration message may further include part or all of the description information of the first sensing service. This is not limited herein.

Further, considering that the first sensing service control message sent by the first network element to the RAN is used to establish a corresponding signaling or user plane connection (such as a sensing service shared channel) for the first sensing service, the first sensing service control message may include at least the tunnel information of the first network element, to indicate an endpoint of the first network element in the tunnel between the RAN and the first network element. In other words, the tunnel information of the first network element can make the RAN learn about an upstream target network element (that is, the first network element) for subsequent sensing measurement data reporting.

The tunnel information of the first network element may include but is not limited to tunnel endpoint identification information (TEID) of the first network element and/or address information of the first network element, such as IP address information of the first network element.

S220. The RAN establishes a sensing service shared channel.

The sensing service shared channel is established by the RAN after the RAN receives the first sensing service control message sent by the first network element. The sensing service shared channel corresponds to the tunnel information of the first network element, and the sensing service shared channel is used for transmitting at least one piece of sensing measurement data corresponding to a first sensing service.

It can be understood that in this embodiment, the tunnel information corresponding to the first network element corresponds to first sensing services initiated by the consumer device (such as the AF) one by one. A sensing service shared channel (which can also be understood as common tunnel) is established for this first sensing service for subsequent sensing measurement data transmission, and all sensing data related to the first sensing service (regardless of how many sensing devices the sensing data comes from) is transmitted through the sensing service shared channel.

In this embodiment, for the sensing service scenario of one or more sensing devices (for example, sensing signal sending devices or sensing signal measurement devices) corresponding to a sensing service, one sensing service shared channel is established for one sensing service, with the granularity being sensing service. This can ensure efficient transmission of sensing measurement data while effectively avoiding problems such as channel redundancy and resource waste caused by establishing multiple transmission channels for one sensing service.

Figure 3:
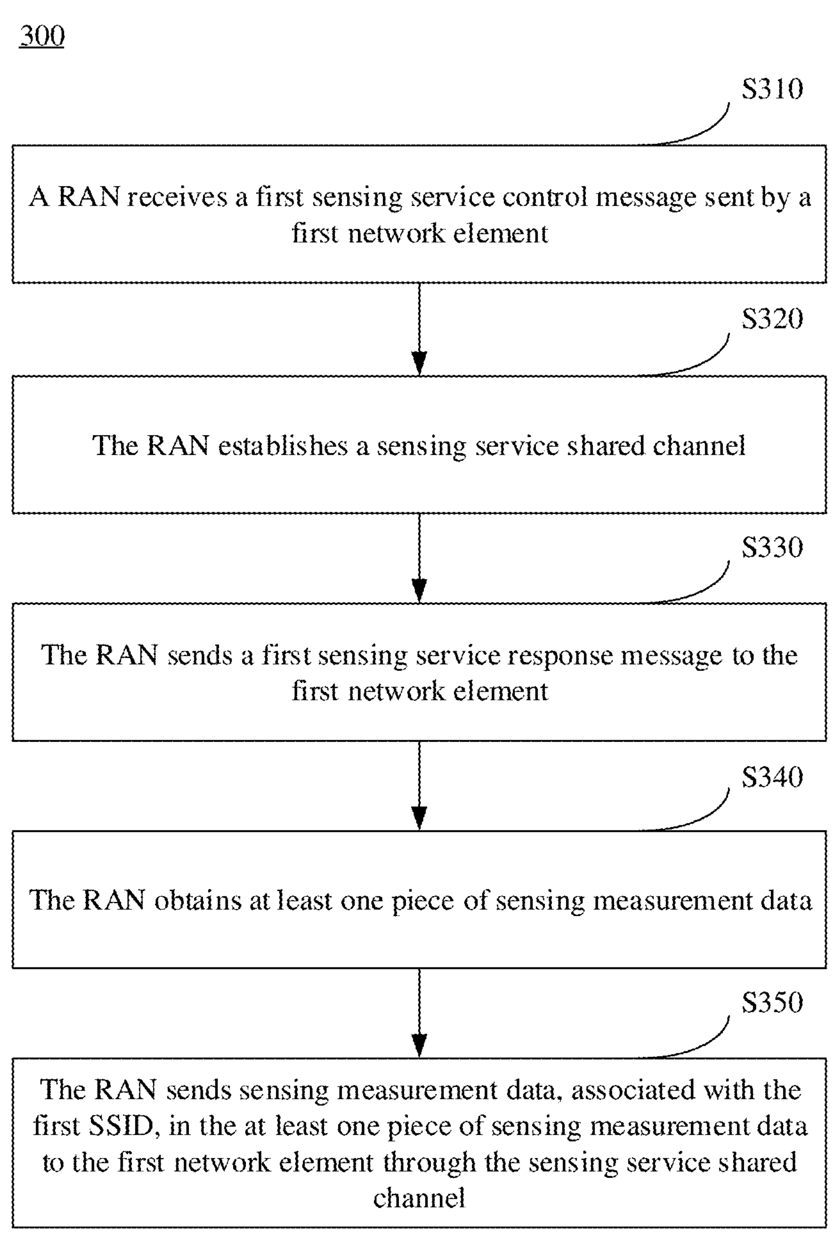
FIG. 3 is a second schematic flowchart of a data transmission method according to an example embodiment of this application.

FIG. 3 is a schematic flowchart of a data transmission method 300 according to an example embodiment of this application. This method 300 can be, but is not limited to, executed by a radio access network (such as an NG-RAN), and may be executed by hardware and/or software installed in the radio access network. In this embodiment, the method 300 can include at least the following steps.

S310. A RAN receives a first sensing service control message sent by a first network element.

The first sensing service control message includes at least tunnel information of the first network element.

It can be understood that for the implementation process of S310, reference may be made to the related description in the method embodiment 200. In a possible implementation, the first sensing service control message further includes at least one of the following (31) to (34).

(31) Policy information of sensing quality of service, used to indicate a sensing service-related resource and/or sensing execution policy allocated to the first sensing service.

Optionally, the policy information of sensing quality of service may include at least one of the following (3101) to (3112):

(3101) sensing delay budget;
(3102) sensing resolution;
(3103) maximum sensing range;
(3104) sensing error;
(3105) continuous sensing capacity;
(3106) sensing update rate;
(3107) sensing security;
(3108) sensing privacy;
(3109) detection probability;
(3110) false alarm probability;
(3111) sensing priority level; or
(3112) sensing signal quality.

It can be understood that for the parameters in (3101) to (3112), reference may be made to the related description in the method embodiment 200. To avoid repetition, details are not repeated herein.

(32) Policy information of transmission quality of service, used to indicate a communication transmission resource and/or communication transmission policy allocated to the first sensing service, such as 5G QoS parameters defined in 3GPP TS 23.501 (for example, 5QI, or ARP).

(33) Description information of the first sensing service.

(34) First SSID corresponding to the first sensing service, where the first SSID corresponds to the sensing service shared channel.

In addition, the first SSID is used to identify to the RAN the sensing session corresponding to the first sensing service. The sensing session corresponds to the sensing service shared channel. In other words, the sensing service shared channel and the first SSID are in a one-to-one correspondence, so that the first network element and the RAN can obtain, analyze, and process the sensing measurement data, modify/delete the first sensing service, and the like based on the first SSID.

It should be noted that in this embodiment, what information to be included in the first sensing service control message can be specified by the protocol, configured by the higher layer, or the like. For example, it can be specified by the protocol that information included in the first sensing service control message varies with the role of the RAN in the sensing network system.

For example, in a case that the RAN acts as a transmission node of the sensing measurement data, the first sensing service control message may include part or all of the policy information of transmission quality of service to instruct the RAN to reserve a corresponding access network resource (such as bandwidth resource) or perform corresponding access network scheduling (such as air interface delay and packet loss rate), so as to transmit the sensing measurement data.

For another example, in a case that the RAN acts as a measurement device of the sensing signal (for example, sensing signal measurement device) and a transmission node of the sensing measurement data, the first sensing service control message may include part or all of the policy information of sensing quality of service to instruct the RAN to perform measurement on the sensing signal according to the policy information of sensing quality of service. For example, the RAN correspondingly performs measurement on the measurement quantity indicated in the policy information of sensing quality of service (for example, signal angle or signal strength) based on a specific measurement accuracy, so as to obtain the sensing measurement data.

Certainly, in this scenario, the first sensing service control message may further include part or all of the description information of the first sensing service.

Further, in an implementation, if the RAN acts only as a transmission node, after receiving the first sensing service control message, the RAN may send a third sensing service control message to the sensing signal measurement device (for example, UE or another RAN) according to the first sensing service control message, so as to establish the first sensing service. For example, the content of the third sensing service control message may be included in the first sensing service control message. After receiving the first sensing service control message, the RAN obtains the content of the third sensing service control message from the first sensing service control message and sends it as the third sensing service control message to the sensing signal measurement device.

Based on this, the third sensing service control message may include at least one of the following (41) to (44):

(41) part or all of policy information of sensing quality of service, used to indicate a sensing service-related resource and/or sensing execution policy allocated to the first sensing service;

(42) part or all of description information of the first sensing service;

(43) part or all of policy information of transmission quality of service applicable to the sensing signal measurement device; or

(44) first SSID corresponding to the first sensing service.

It can be understood that for the implementation of (41) to (44), reference may be made to the related description of the first sensing service control message. To avoid repetition, details are not repeated herein.

Correspondingly, after receiving the third sensing service control message, the sensing signal measurement device may further perform measurement on the sensing signal according to the third sensing service control message to obtain at least one piece of sensing measurement data, and send the at least one piece of sensing measurement data to the RAN through the data channel.

In a possible implementation, in sending the at least one piece of sensing measurement data through the data channel, the sensing signal measurement device may further send an SSID corresponding to each of the at least one piece of sensing measurement data, for use by the RAN to perform association of sensing measurement data.

It should be noted that the "data channel" between the sensing signal measurement device and the RAN and used for transmitting the at least one piece of sensing measurement data may be established by the sensing signal measurement device based on the second sensing service control message received. In other words, the RAN may send the second sensing service control message to the sensing signal measurement device, so that the sensing signal measurement device establishes the data channel between the RAN and the sensing signal measurement device according to the second sensing service control message. This enables the sensing signal measurement device to send the at least one piece of sensing measurement data to the RAN through the data channel between the RAN and the sensing signal measurement device.

It can be understood that in a case that the sensing signal measurement device includes a sensing terminal device, the data channel between the RAN and the sensing terminal device is an air interface data radio bearer (that is, data radio bearer (DRB).

Alternatively, in a case that the sensing signal measurement device includes a sensing base station device, a data channel between the RAN and the sensing base station device is an Xn interface data bearer.

Optionally, the second sensing service control message may include at least one of the following (51) to (54):

(51) the first SSID;

(52) part or all of the policy information of sensing quality of service;

(53) part or all of description information of the first sensing service; or

(54) part or all of policy information of transmission quality of service applicable to the sensing signal measurement device.

It can be understood that for the implementation of (51) to (54), reference may be made to the related description of the first sensing service control message. To avoid repetition, details are not repeated herein.

In addition, the third sensing control message and the second sensing control message may both be sent via the RAN. For example, if the first sensing service control message sent by the first network element to the RAN includes contents of information elements of the second sensing control message and third sensing control message, the RAN obtains the information element required by the RAN from such message, and forwards the information element destined for the sensing signal measurement device to the sensing signal measurement device in the form of one message (for example, combining the second sensing control message and the third sensing control message), or forwards the information element destined for the sensing signal measurement device to the sensing signal measurement device in the form of two messages (for example, the second sensing control message and the third sensing control message being separate).

It should be noted that the first sensing service control message, second sensing service control message, and third sensing service control message may all be transmitted in the form of a signaling container to improve transmission reliability and security.

For example, the first sensing service control message being transmitted in the form of signaling container is used as an example for description. The first network element may encapsulate the first sensing service control message into a signaling container for transmission to the RAN. The content of the signaling container is not visible to other network elements than the RAN.

Optionally, the first network element may encapsulate all information in the first sensing service control message into one signaling container, or split the information in the first sensing service control message and encapsulate the information split into multiple signaling containers. For example, the tunnel information of the first network element and the policy information of sensing quality of service are encapsulated into a first signaling container, and the policy information of sensing quality of service and the description information of the first sensing service are encapsulated into a second signaling container. This is not limited herein.

S320. The RAN establishes a sensing service shared channel.

The sensing service shared channel corresponds to the tunnel information of the first network element, and the sensing service shared channel is used for transmitting at least one piece of sensing measurement data corresponding to a first sensing service.

It can be understood that for the implementation process of S320, reference may be made to the related description in the method embodiment 200. In a possible implementation, the process of the RAN establishing the sensing service shared channel may include: establishing, by the RAN, the sensing service shared channel according to the policy information of sensing quality of service, where the sensing service shared channel transmits the sensing measurement data for the first sensing service according to the policy information of transmission quality of service. In this way, as a result, the sensing measurement data can be measured and transmitted according to the sensing quality of service requirement, thereby improving the quality of service of the sensing service on the whole.

S330. The RAN sends a first sensing service response message to the first network element.

The first sensing service response message is used to indicate to the first network element whether the sensing service shared channel has been successfully established. Optionally, the first sensing service response message includes at least one of the following (61) to (63):

(61) first indication information, used to indicate to the first network element whether the sensing service shared channel corresponding to the first sensing service has been successfully established;

(62) tunnel information of the RAN; where optionally, the tunnel information of the RAN includes tunnel endpoint identification information of the RAN and/or address information of the RAN, for example, IP address information of the RAN; or

(63) second indication information, used to indicate to the first network element whether the first sensing service has been accepted or successfully executed.

It should be noted that in a case that the RAN acts as a transmission node, the second indication information comes from one or more sensing devices (for example, sensing signal sending device and/or sensing signal measurement device), that is, the second indication information is used to indicate to the first network element whether the first sensing service has been accepted or successfully executed by the sensing device.

In addition, the first indication information and second indication information may be explicitly or implicitly indicated. This is not limited herein.

S340. The RAN obtains at least one piece of sensing measurement data.

Optionally, a manner of obtaining the sensing measurement data by the RAN can vary with sensing signal measurement devices.

For example, if the RAN may act as a sensing signal measurement device, the RAN can receive a sensing signal sent by at least one sensing signal sending device, and accordingly perform measurement on at least one sensing signal received, to obtain at least one piece of sensing measurement data corresponding to the at least one sensing signal, that is, the at least one piece of sensing measurement data.

For another example, if the RAN acts as a transmission node but not as a sensing signal measurement device, the RAN receives at least one piece of sensing measurement data from at least one sensing signal measurement device, where the at least one piece of sensing measurement data is obtained by the at least one sensing signal measurement device through measurement on a sensing signal.

For another example, in a case of acting as a sensing signal measurement device, the RAN may further receive sensing measurement data sent by another sensing signal measurement device, and use the sensing measurement data obtained through measurement by itself and the received sensing measurement data as the at least one piece of sensing measurement data.

In view of this, in an implementation, while obtaining the sensing signal measurement data, the RAN may further obtain an SSID corresponding to each piece of the sensing measurement data and determine, based on whether the SSID corresponding to each piece of the sensing measurement data matches the first SSID, whether each piece of the sensing measurement data is associated with the first SSID. For example, in a match case, the RAN determines to associate the sensing signal measurement data with the first SSID. Otherwise, the RAN determines not to associate the sensing signal measurement data with the first SSID.

Optionally, the RAN may obtain the SSID corresponding to each piece of the sensing measurement data in the following manner 1 and/or manner 2.

Manner 1. The RAN receives an SSID corresponding to each piece of the sensing measurement data and sent by the at least one sensing signal measurement device.

Manner 2. The RAN obtains, based on an identifier of the at least one sensing signal measurement device and/or the identification information of RAN tunnel (that is, a data channel between the RAN and the sensing signal measurement device), the SSID corresponding to each piece of the sensing measurement data.

It can be understood that in manner 2, for a specific sensing service (for example, the first sensing service), the RAN may establish a mapping relationship between a data channel and an SSID of the specific sensing service when establishing the data channel to each sensing signal measurement device. In this way, after receiving the sensing measurement data sent by the sensing signal measurement device, the RAN can map out a corresponding SSID, that is, an SSID corresponding to the sensing measurement data, based on identification information of the sensing signal measurement device and identification information of the sensing service shared channel.

S350. The RAN sends sensing measurement data, associated with the first SSID, in the at least one piece of sensing measurement data to the first network element through the sensing service shared channel.

Optionally, in a case that the RAN sends the sensing measurement data through the sensing service shared channel, the sensing measurement data is sent as uplink data to the first network element based on the tunnel information of the first network element.

Correspondingly, after receiving the sensing measurement data sent by the RAN, the first network element may obtain an analysis result of the first sensing service based on the sensing measurement data.

For example, the first network element may analyze the sensing measurement data based on a pre-configured algorithm corresponding to the first sensing service, to obtain the analysis result of the first sensing service, and send the analysis result of the first sensing service to a consumer device such as an AF. The algorithm may be an AI-based intelligent algorithm, may be an intelligent entity algorithm from the outside, or may be an AI model training algorithm from the first network element itself. This is not limited herein.

Optionally, depending on the first sensing service, the analysis result of the first sensing service may be respiratory health status information of a user (whether respiration is abnormal, the degree of abnormality, and the like), or may be surrounding traffic danger information (whether there are pedestrians suddenly appearing, the probability of appearance, and the time of appearance), or the like.

Further, like the establishment of the sensing service shared channel, if the first network element determines to modify (for example, a trigger message from the consumer device has been received) the first sensing service, the first network element may reuse the same path established for the sensing service shared channel, to request the RAN to modify the sensing service shared channel established for the first sensing service.

For example, the first network element can send a sensing service modify request message to the RAN, and the sensing service modify request message includes at least the first SSID and/or the tunnel information of the first network element. The sensing service modify request is used at least to modify the policy information of transmission quality of service corresponding to the first sensing service. After receiving the sensing service modify request message, the RAN may modify the sensing service shared channel corresponding to the first SSID and/or tunnel information of the first network element, so that the sensing service shared channel transmits the sensing measurement data of the first sensing service according to the modified policy information of transmission quality of service.

In addition, like the establishment of the sensing service shared channel, if the first network element determines to end (for example, a trigger message from the consumer device has been received) the first sensing service, the first network element may reuse the same path established for the sensing service shared channel, to request the RAN to release or delete the sensing service shared channel established for the first sensing service.

For example, the first network element may send a sensing service delete request message to the RAN, where the sensing service delete request message includes at least one of the following: the first SSID or the tunnel information of the first network element. After receiving the sensing service delete request message, the RAN may release or delete a sensing service shared channel corresponding to the first SSID and/or the tunnel information of the first network element.

In this embodiment, a sensing service shared channel of a service granularity (for example, the first sensing service) is established by the sensing network system in response to a request from the consumer device. Therefore, despite being obtained by measuring multiple sensing signals or being measurement results output by multiple sensing signal measurement devices, the sensing measurement data related to the sensing service can be reported to the first network element through the sensing service shared channel corresponding to the sensing service. Therefore, this can avoid the problem that multiple transmission channels need to be established for one sensing service but different sensing devices, effectively avoiding resource waste.

In addition, the sensing quality of service requirement and transmission quality of service requirement required by the sensing service are considered, so that the sensing service measurement is executed according to the policy information of sensing quality of service, and the sensing measurement data is transmitted in the sensing service shared channel according to the policy information of transmission quality of service. This achieves joint optimization of sensing quality of service and transmission quality of service, improving the quality of service of the sensing service on the whole.

Further, on the basis of the description of the method embodiments 200 and 300, the implementation processes of the data transmission methods in this application are further described by using examples 1 and 2 below. The details are as follows.

Example 1

Figure 4:
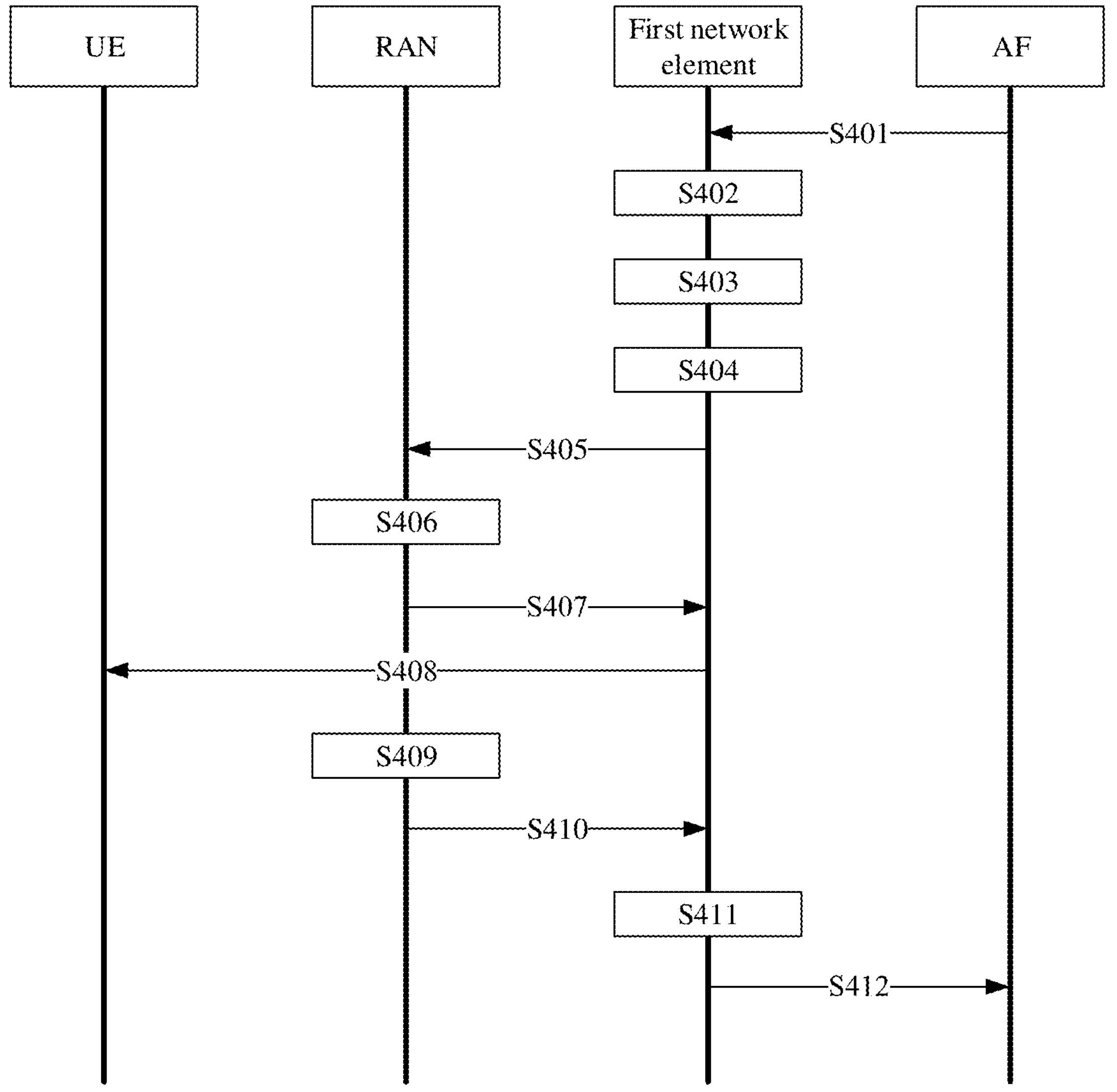
FIG. 4 is a first schematic flowchart of interaction of a data transmission method according to an example embodiment of this application.

As shown in FIG. 4, an AF is a consumer device, a RAN acts as a sensing signal measurement device and transmission node, and UE is a sensing signal sending device. It can be understood that for ease of description, only one sensing signal sending device and one sensing signal measurement device are shown in FIG. 4, but in reality, there may be multiple sensing signal sending devices and sensing signal measurement devices.

S401. The AF sends a sensing service request message to a first network element.

S402. In response to the sensing service request message, the first network element selects a sensing device to serve a first sensing service, for example, one or more sensing signal sending devices, or one or more sensing signal measurement devices.

S403. The first network element obtains target policy information corresponding to the first sensing service in response to the sensing service request message.

S404. In response to the sensing service request message, the first network element establishes a sensing session corresponding to the first sensing service and allocates a first SSID to the first sensing service.

S403 and S404 are not executed in order.

S405. The first network element sends a first sensing service control message to the RAN.

S406. The RAN establishes a sensing service shared channel corresponding to the first sensing service based on the first sensing service control message.

S407. The RAN sends a first sensing service response message to the first network element.

S408. The first network element sends a sensing resource configuration message to the UE.

S409. The RAN obtains at least one piece of sensing measurement data.

S410. The RAN sends the at least one piece of sensing measurement data to the first network element through the sensing service shared channel.

S411. The first network element analyzes and processes the at least one piece of sensing measurement data received, to obtain an analysis result of the first sensing service.

S412. The first network element sends the at least one piece of sensing measurement data and/or the analysis result of the first sensing service to the AF.

Example 2

Figures 5, 6:
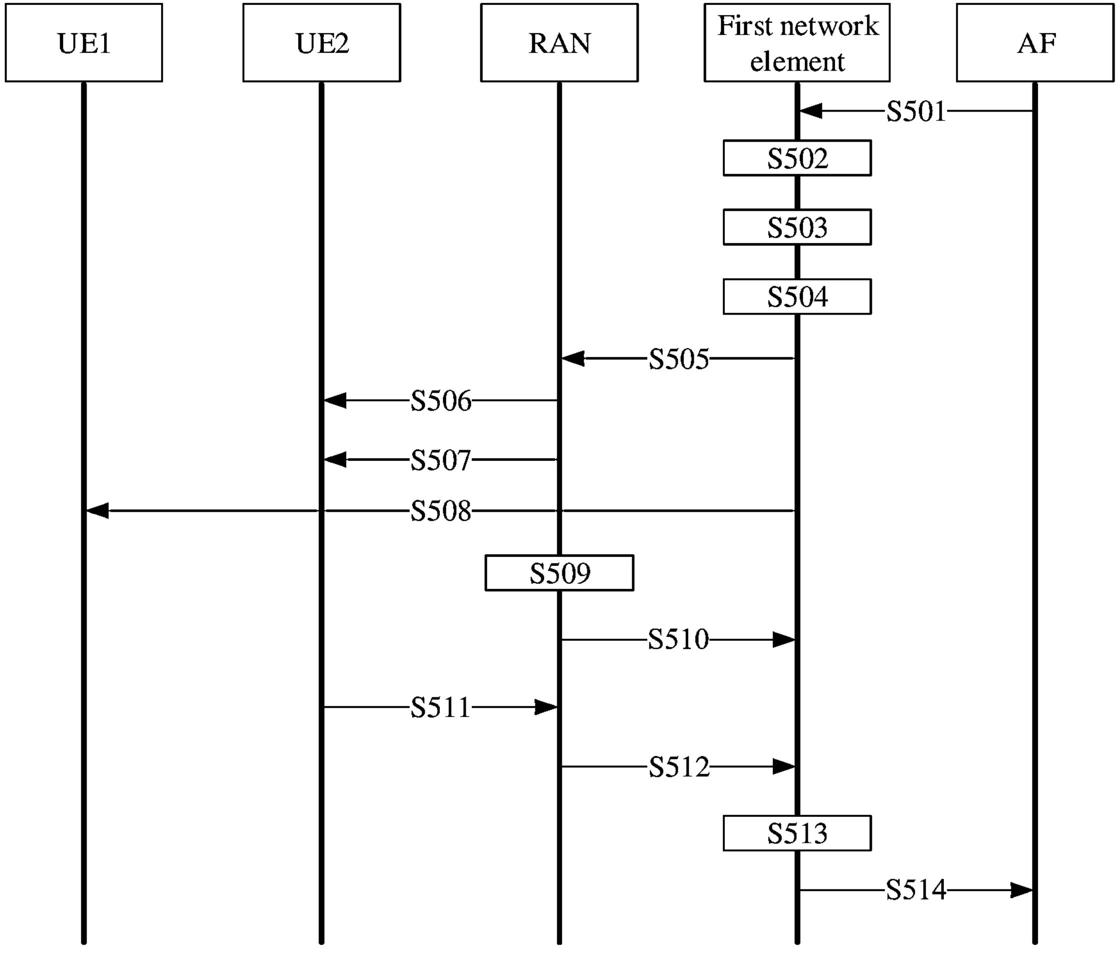
FIG. 5 is a second schematic flowchart of interaction of a data transmission method according to an example embodiment of this application.
FIG. 6 is a third schematic flowchart of a data transmission method according to an example embodiment of this application.

As shown in FIG. 5, an AF is a consumer device, UE1 acts as a sensing signal sending device, UE2 acts as a sensing signal measurement device, and a RAN acts as a transmission node. It can be understood that for ease of description, only one sensing signal sending device and one sensing signal measurement device are shown in FIG. 5, but in reality, there can be multiple sensing signal sending devices and sensing signal measurement devices.

S501. The AF sends a sensing service request message to a first network element.

S502. In response to the sensing service request message, the first network element selects a sensing device to serve a first sensing service, for example, one or more sensing signal sending devices, or one or more sensing signal measurement devices.

S503. The first network element obtains target policy information corresponding to the first sensing service in response to the sensing service request message.

S504. In response to the sensing service request message, the first network element establishes a sensing session corresponding to the first sensing service and allocates a first SSID to the first sensing service.

S503 and S505 are not executed in order.

S505. The first network element sends a first sensing service control message to the RAN.

S506. The first network element sends a third sensing service control message to the UE2 in response to the sensing service request message.

The third sensing service control message may be forwarded to the UE2 via the RAN.

S507. The RAN sends a second sensing service control message to the UE2 based on the first sensing service control message.

The content of the second sensing service control message and the third sensing service control message may be combined into one message to be sent by the RAN to UE2.

S508. The first network element sends a sensing resource configuration message to the UE1 in response to the sensing service request message. The sensing resource configuration message may be forwarded to the UE1 via the RAN.

S509. The RAN establishes a sensing service shared channel corresponding to the first sensing service based on the first sensing service control message.

S510. The RAN sends a sensing service response message to the first network element, where second indication information included in the sensing service response message comes from the UE1 and/or UE2.

S511. The UE2 sends at least one piece of sensing measurement data corresponding to different SSIDs to the RAN.

S512. The RAN sends the at least one piece of sensing measurement data associated with the first SSID to the first network element through the sensing service shared channel.

S513. The first network element analyzes and processes the received at least one piece of sensing measurement data associated with the first SSID, to obtain an analysis result of the first sensing service.

S514. The first network element sends the at least one piece of sensing measurement data associated with the first SSID and/or the analysis result of the first sensing service to the AF.

It can be understood that for the implementation process of the steps in the data transmission procedure given in examples 1 and 2, reference may be made to the related description in the method embodiments 200 to 400, with the same or corresponding technical effects achieved. To avoid repetition, details are not repeated herein.

In addition, the data transmission procedure given in examples 1 and 2 may include but is not limited to S401 to S412 or S501 to S514. For example, the data transmission procedure may include more or fewer steps than S401 to S412 or S501 to S514. This is not limited herein.

FIG. 6 is a schematic flowchart of a data transmission method 600 according to an example embodiment of this application. This method 600 can be executed by a first network element but is not limited thereto, and may be executed by hardware and/or software installed in the first network element. In this embodiment, the method 600 can include at least the following steps.

S610. In a case that a sensing service request message sent by a consumer device is received, a first network element sends a first sensing service control message in response to the sensing service request message to a radio access network (RAN), where the first sensing service control message includes at least tunnel information of the first network element. The first sensing service control message is used to instruct the RAN to establish a sensing service shared channel. The sensing service shared channel corresponds to the tunnel information of the first network element, and the sensing service shared channel is used for transmitting at least one piece of sensing measurement data corresponding to a first sensing service.

Optionally, the tunnel information of the first network element includes tunnel endpoint identification information of the first network element and/or address information of the first network element.

Optionally, the first sensing service control message further includes at least one of the following: policy information of sensing quality of service, used to indicate a sensing service-related resource and/or sensing execution policy allocated by a communication network to the first sensing service; policy information of transmission quality of service, used to indicate a communication transmission resource and/or communication transmission policy allocated by a communication network to the first sensing service; description information of the first sensing service; or first sensing session identification (SSID) information corresponding to the first sensing service, where the first SSID corresponds to the sensing service shared channel.

Optionally, the policy information of sensing quality of service includes at least one of the following: sensing delay budget; sensing resolution; maximum sensing range; sensing error; continuous sensing capacity; sensing update rate; sensing security; sensing privacy; detection probability; false alarm probability; sensing priority level; or sensing signal quality.

Optionally, the first SSID is allocated by the first network element for the first sensing service according to the sensing service request message.

Optionally, the method further includes: receiving, by the first network element, a first sensing service response message sent by the RAN, where the first sensing service response message is at least used to indicate to the first network element whether the sensing service shared channel has been successfully established.

Optionally, the first sensing service response message includes at least one of the following: first indication information, used to indicate to the first network element whether the sensing service shared channel corresponding to the first sensing service has been successfully established; tunnel information of the RAN; or second indication information, used to indicate to the first network element whether the first sensing service has been accepted or successfully executed.

Optionally, the tunnel information of the RAN includes tunnel endpoint identification information of the RAN and/or address information of the RAN.

Optionally, the method further includes: obtaining, by the first network element, target policy information corresponding to the first sensing service in response to the sensing service request message, where the target policy information includes policy information of sensing quality of service and/or policy information of transmission quality of service.

Optionally, the step of obtaining, by the first network element, target policy information includes at least one of the following: sending, by the first network element, a policy request message to a policy control function PCF to obtain the target policy information from the PCF; or generating, by the first network element, the target policy information.

Optionally, the policy request message includes at least one of the following: description information of the first sensing service; target area of the first sensing service; information about a target user of the first sensing service; or identification information of a sensing device, where the sensing device includes a sensing signal sending device and/or a sensing signal measurement device.

Optionally, the method further includes: receiving, by the first network element, sensing measurement data sent by the RAN through the sensing service shared channel, where the sensing measurement data is associated with the first SSID.

Optionally, the method further includes: sending, by the first network element, a sensing service modify request message to the RAN, where the sensing service modify request message includes at least the first SSID and/or the tunnel information of the first network element; where the sensing service modify request message is used to indicate to the RAN to modify a sensing service shared channel corresponding to the first SSID and/or the tunnel information of the first network element.

Optionally, the method further includes: sending, by the first network element, a sensing service delete request message to the RAN, where the sensing service delete request message includes at least one of the following: the first SSID and the tunnel information of the first network element; where the sensing service delete request message is used to indicate the RAN to delete a sensing service shared channel corresponding to at least one of the first SSID or the tunnel information of the first network element.

It can be understood that for the implementation process of the implementations in the method embodiment 600, reference may be made to the related description in the method embodiments 200 to 500, with the same or corresponding technical effects achieved. To avoid repetition, details are not repeated herein.

Figure 7:
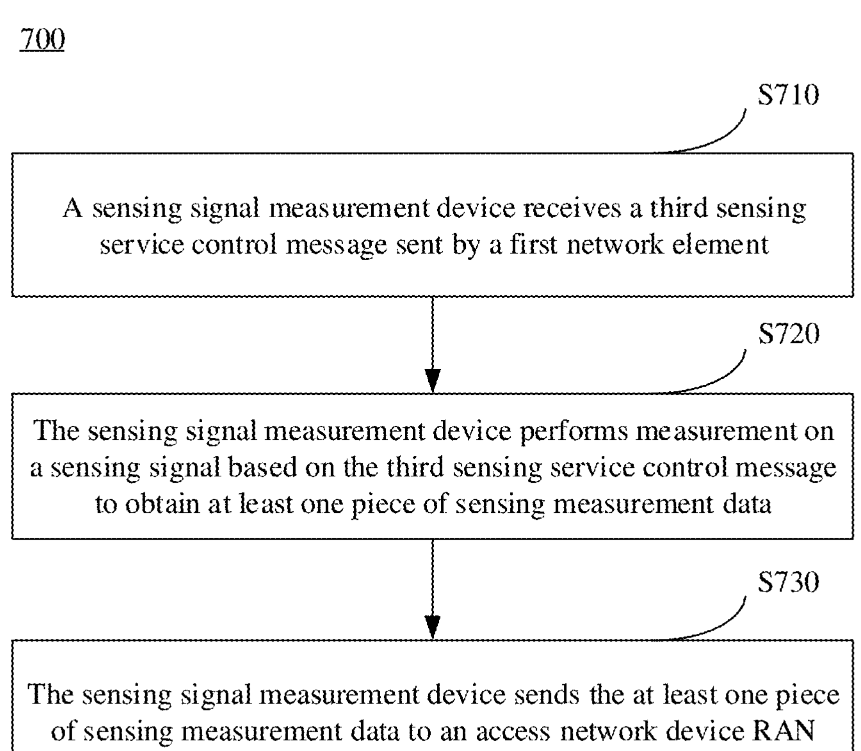
FIG. 7 is a fourth schematic flowchart of a data transmission method according to an example embodiment of this application.

FIG. 7 is a schematic flowchart of a data transmission method 700 according to an example embodiment of this application. This method 700 can be executed by a sensing signal measurement device but is not limited thereto, and may be executed by hardware and/or software installed in the sensing signal measurement device. In this embodiment, the method 700 can include at least the following steps.

S710. A sensing signal measurement device receives a third sensing service control message sent by a first network element, where the third sensing service control message is used for establishing a first sensing service.

S720. The sensing signal measurement device performs measurement on a sensing signal based on the third sensing service control message to obtain at least one piece of sensing measurement data, where the sensing signal corresponds to the first sensing service.

S730. The sensing signal measurement device sends the at least one piece of sensing measurement data to a radio access network (RAN).

Optionally, the third sensing service control message includes at least one of the following: part or all of policy information of sensing quality of service, used to indicate a sensing service-related resource and/or sensing execution policy allocated to the first sensing service; part or all of description information of the first sensing service; part or all of policy information of transmission quality of service applicable to the sensing signal measurement device; or first sensing session identification (SSID) information corresponding to the first sensing service.

Optionally, the policy information of sensing quality of service includes at least one of the following: sensing delay budget; sensing resolution; maximum sensing range; sensing error; continuous sensing capacity; sensing update rate; sensing security; sensing privacy; detection probability; false alarm probability; sensing priority level; or sensing signal quality.

Optionally, the method further includes: sending, by the sensing signal measurement device, an SSID corresponding to each of the at least one piece of sensing measurement data, for use by the RAN to perform sensing measurement data association.

Optionally, the method further includes: receiving, by the sensing signal measurement device, a second sensing service control message sent by the RAN, where the second sensing service control message is used for establishing a data channel between the RAN and the sensing signal measurement device; and establishing, by the sensing signal measurement device, a data channel between the RAN and the sensing signal measurement device based on the second sensing service control message; and the step of sending, by the sensing signal measurement device, the at least one piece of sensing measurement data to a radio access network (RAN) includes: sending, by the sensing signal measurement device, the at least one piece of sensing measurement data to the RAN through the data channel between the RAN and the sensing signal measurement device.

It can be understood that for the implementation process of the implementations in the method embodiment 700, reference may be made to the related description in the method embodiments 200 to 500, with the same or corresponding technical effects achieved. To avoid repetition, details are not repeated herein.

The data transmission methods 200 to 700 provided in the embodiments of this application can be performed by a data transmission apparatus. In the embodiments of this application, the data transmission apparatus performing the data transmission method is used to describe the data transmission apparatus provided in the embodiments of this application.

Figure 8:
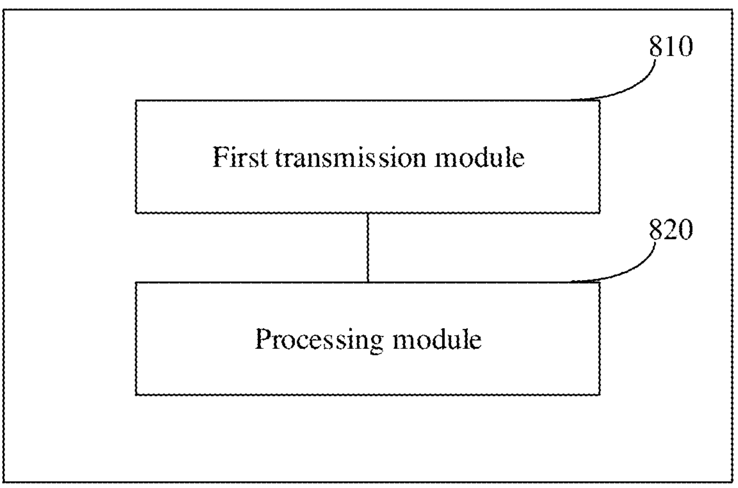
FIG. 8 is a first schematic structural diagram of a data transmission apparatus according to an example embodiment of this application.

FIG. 8 is a schematic structural diagram of a data transmission apparatus 800 according to an example embodiment of this application. The apparatus 800 includes: a first transmission module 810, configured to receive a first sensing service control message sent by a first network element, where the first sensing service control message includes at least tunnel information of the first network element; and a processing module 820, configured to establish a sensing service shared channel, where the sensing service shared channel corresponds to the tunnel information of the first network element, and the sensing service shared channel is used for transmitting at least one piece of sensing measurement data corresponding to a first sensing service.

Optionally, the tunnel information of the first network element includes tunnel endpoint identification information of the first network element and/or address information of the first network element.

Optionally, the first sensing service control message further includes at least one of the following: policy information of sensing quality of service, used to indicate a sensing service-related resource and/or sensing execution policy allocated to the first sensing service; policy information of transmission quality of service, used to indicate a communication transmission resource and/or communication transmission policy allocated to the first sensing service; description information of the first sensing service; or first sensing session identification (SSID) information corresponding to the first sensing service, where the first SSID corresponds to the sensing service shared channel.

Optionally, the policy information of sensing quality of service includes at least one of the following: sensing delay budget; sensing resolution; maximum sensing range; sensing error; continuous sensing capacity; sensing update rate;

sensing security; sensing privacy; detection probability; false alarm probability; sensing priority level; or sensing signal quality.

Optionally, the step of the processing module 820 establishing a sensing service shared channel includes: establishing the sensing service shared channel based on the policy information of sensing quality of service, where the sensing service shared channel transmits the sensing measurement data for the first sensing service according to the policy information of transmission quality of service.

Optionally, the first transmission module 810 is further configured to send a first sensing service response message to the first network element, where the first sensing service response message is at least used to indicate to the first network element whether the sensing service shared channel has been successfully established.

Optionally, the first sensing service response message includes at least one of the following: first indication information, used to indicate to the first network element whether the sensing service shared channel corresponding to the first sensing service has been successfully established; tunnel information of the RAN; or second indication information, used to indicate to the first network element whether the first sensing service has been accepted or successfully executed.

Optionally, the tunnel information of the RAN includes tunnel endpoint identification information of the RAN and/or address information of the RAN.

Optionally, the processing module 820 is further configured to obtain at least one piece of sensing measurement data, and send sensing measurement data, associated with the first SSID, in the at least one piece of sensing measurement data to the first network element through the sensing service shared channel.

Optionally, the step of the processing module 820 obtaining at least one piece of sensing measurement data includes at least one of the following: performing measurement on a received sensing signal sent by at least one sensing signal sending device to obtain the at least one piece of sensing measurement data; or receiving at least one piece of sensing measurement data sent by at least one sensing signal measurement device, where the at least one piece of sensing measurement data is obtained by the at least one sensing signal measurement device through measurement on a sensing signal.

Optionally, the processing module 820 is further configured to obtain an SSID corresponding to each piece of the sensing measurement data and determine, based on whether the SSID corresponding to each piece of the sensing measurement data matches the first SSID, whether each piece of the sensing measurement data is associated with the first SSID.

Optionally, the step of the processing module 820 obtaining the SSID corresponding to each piece of the sensing measurement data includes at least one of the following: receiving the SSID corresponding to each piece of the sensing measurement data and sent by the at least one sensing signal measurement device; or obtaining, based on an identifier of the at least one sensing signal measurement device and/or identification information of the RAN tunnel, an SSID corresponding to each piece of the sensing measurement data.

Optionally, the first transmission module 810 is further configured to send, based on the first sensing service control message, a second sensing service control message to a sensing signal measurement device associated with the first sensing task; where the second sensing service control message is used for establishing a data channel between the RAN and the sensing signal measurement device.

Optionally, in a case that the sensing signal measurement device includes a sensing terminal device, a data channel between the RAN and the sensing terminal device is an air interface data radio bearer; or in a case that the sensing signal measurement device includes a sensing base station device, a data channel between the RAN and the sensing base station device is an Xn interface data bearer.

Optionally, the second sensing service control message includes at least one of the following: the first SSID; part or all of the policy information of sensing quality of service; part or all of description information of the first sensing service; or part or all of policy information of transmission quality of service applicable to the sensing signal measurement device.

Optionally, the first transmission module 810 is further configured to receive a sensing service delete request message sent by the first network element, where the sensing service delete request message includes at least the first SSID and/or the tunnel information of the first network element; and the processing module 820 is further configured to delete a sensing service shared channel corresponding to the first SSID and/or the tunnel information of the first network element.

Figure 9:
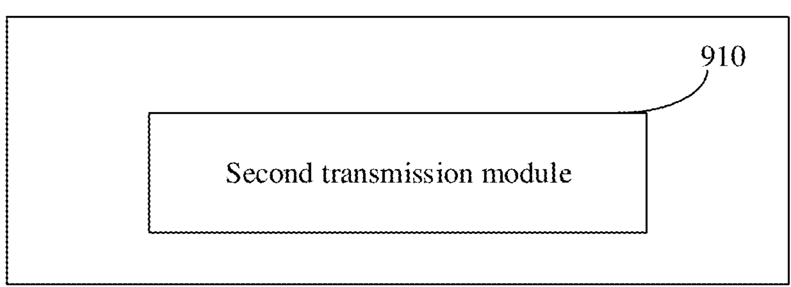
FIG. 9 is a first schematic structural diagram of a data transmission apparatus according to an example embodiment of this application.

FIG. 9 shows a data transmission apparatus 900 according to an example embodiment of this application. The apparatus 900 includes a second transmission module 910 configured to: in a case that a sensing service request message sent by a consumer device is received, send a first sensing service control message in response to the sensing service request message to a radio access network (RAN), where the first sensing service control message includes at least tunnel information of the first network element; where the first sensing service control message is used to instruct the RAN to establish a sensing service shared channel, where the sensing service shared channel corresponds to the tunnel information of the first network element, and the sensing service shared channel is used for transmitting at least one piece of sensing measurement data corresponding to a first sensing service.

Optionally, the tunnel information of the first network element includes tunnel endpoint identification information of the first network element and/or address information of the first network element.

Optionally, the first sensing service control message further includes at least one of the following: policy information of sensing quality of service, used to indicate a sensing service-related resource and/or sensing execution policy allocated by a communication network to the first sensing service; policy information of transmission quality of service, used to indicate a communication transmission resource and/or communication transmission policy allocated by a communication network to the first sensing service; description information of the first sensing service; or first sensing session identification (SSID) information corresponding to the first sensing service, where the first SSID corresponds to the sensing service shared channel.

Optionally, the policy information of sensing quality of service includes at least one of the following: sensing delay budget; sensing resolution; maximum sensing range; sensing error; continuous sensing capacity; sensing update rate; sensing security; sensing privacy; detection probability; false alarm probability; sensing priority level; or sensing signal quality.

Optionally, the first SSID is allocated by the first network element for the first sensing service according to the sensing service request message.

Optionally, the second transmission module 910 is further configured to receive a first sensing service response message sent by the RAN, where the first sensing service response message is at least used to indicate to the first network element whether the sensing service shared channel has been successfully established.

Optionally, the first sensing service response message includes at least one of the following: first indication information, used to indicate to the first network element whether the sensing service shared channel corresponding to the first sensing service has been successfully established; tunnel information of the RAN; or second indication information, used to indicate to the first network element whether the first sensing service has been accepted or successfully executed.

Optionally, the tunnel information of the RAN includes tunnel endpoint identification information of the RAN and/or address information of the RAN.

Optionally, the apparatus 900 further includes a second obtaining module, configured to obtain target policy information corresponding to the first sensing service in response to the sensing service request message, where the target policy information includes policy information of sensing quality of service and/or policy information of transmission quality of service.

Optionally, the step of the second obtaining module obtaining the target policy information includes at least one of the following: sending, by the first network element, a policy request message to a policy control function PCF to obtain the target policy information from the PCF; or generating, by the first network element, the target policy information.

Optionally, the policy request message includes at least one of the following: description information of the first sensing service; target area of the first sensing service; information about a target user of the first sensing service; or identification information of a sensing device, where the sensing device includes a sensing signal sending device and/or a sensing signal measurement device.

Optionally, the second transmission module 910 is further configured to receive sensing measurement data sent by the RAN through the sensing service shared channel, where the sensing measurement data is associated with the first SSID.

Optionally, the apparatus 900 further includes a second transmission module 910 configured to send a sensing service delete request message to the RAN, where the sensing service delete request message includes at least one of the following: the first SSID or the tunnel information of the first network element; where the sensing service delete request message is used to indicate the RAN to delete a sensing service shared channel corresponding to at least one of the first SSID or the tunnel information of the first network element.

Figure 10:
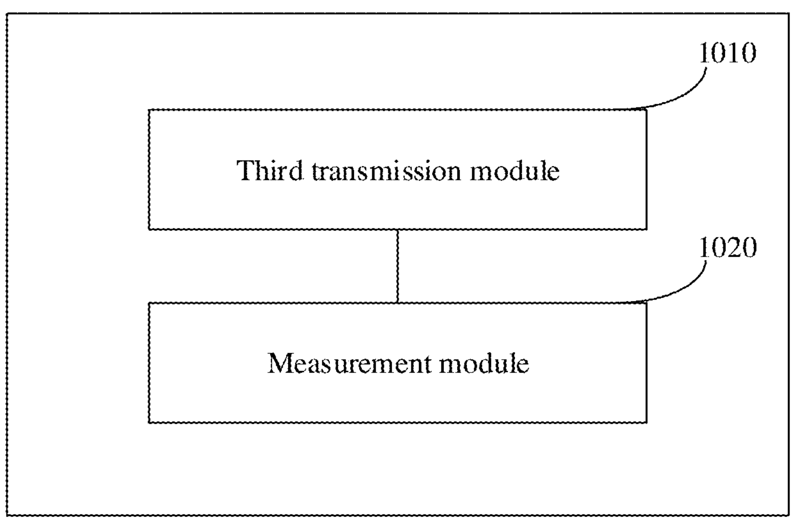
FIG. 10 is a first schematic structural diagram of a data transmission apparatus according to an example embodiment of this application.

FIG. 10 is a schematic structural diagram of a data transmission apparatus 1000 according to an example embodiment of this application. The apparatus 1000 includes: a third transmission module 1010 configured to receive a third sensing service control message sent by a first network element, where the third sensing service control message is used for establishing a first sensing service; and a measurement module 1020 configured to perform measurement on a sensing signal based on the third sensing service control message to obtain at least one piece of sensing measurement data, where the sensing signal corresponds to the first sensing service; where the third transmission module 1010 sends the at least one piece of sensing measurement data to a radio access network (RAN).

Optionally, the third sensing service control message includes at least one of the following: part or all of policy information of sensing quality of service, used to indicate a sensing service-related resource and/or sensing execution policy allocated to the first sensing service; part or all of description information of the first sensing service; part or all of policy information of transmission quality of service applicable to the sensing signal measurement device; first sensing session identification (SSID) information corresponding to the first sensing service.

Optionally, the policy information of sensing quality of service includes at least one of the following: sensing delay budget; sensing resolution; maximum sensing range; sensing error; continuous sensing capacity; sensing update rate; sensing security; sensing privacy; detection probability; false alarm probability; sensing priority level; or sensing signal quality.

Optionally, the third transmission module 1010 is further configured to send an SSID corresponding to each of the at least one piece of sensing measurement data, for use by the RAN to perform sensing measurement data association.

Optionally, the third transmission module 1010 is further configured to receive a second sensing service control message sent by the RAN, where the second sensing service control message is used for establishing a data channel between the RAN and the sensing signal measurement device; and establish a data channel between the RAN and the sensing signal measurement device based on the second sensing service control message; and the step of the third transmission module 1010 sending the at least one piece of sensing measurement data to a radio access network (RAN) includes: sending the at least one piece of sensing measurement data to the RAN through the data channel between the RAN and the sensing signal measurement device.

The data transmission apparatuses 800 and 900 in the embodiments of this application may be an apparatus, or an apparatus, electronic device, or network-side device having an operating system, or may be a component, an integrated circuit, or a chip in an electronic device or network-side device. This is not limited in the embodiments of this application.

The data transmission apparatuses 800 and 900 provided in the embodiments of this application can implement the processes that are implemented in the method embodiments of FIG. 2 to FIG. 7, with the same technical effects achieved. To avoid repetition, details are not described herein again.

Figure 11:
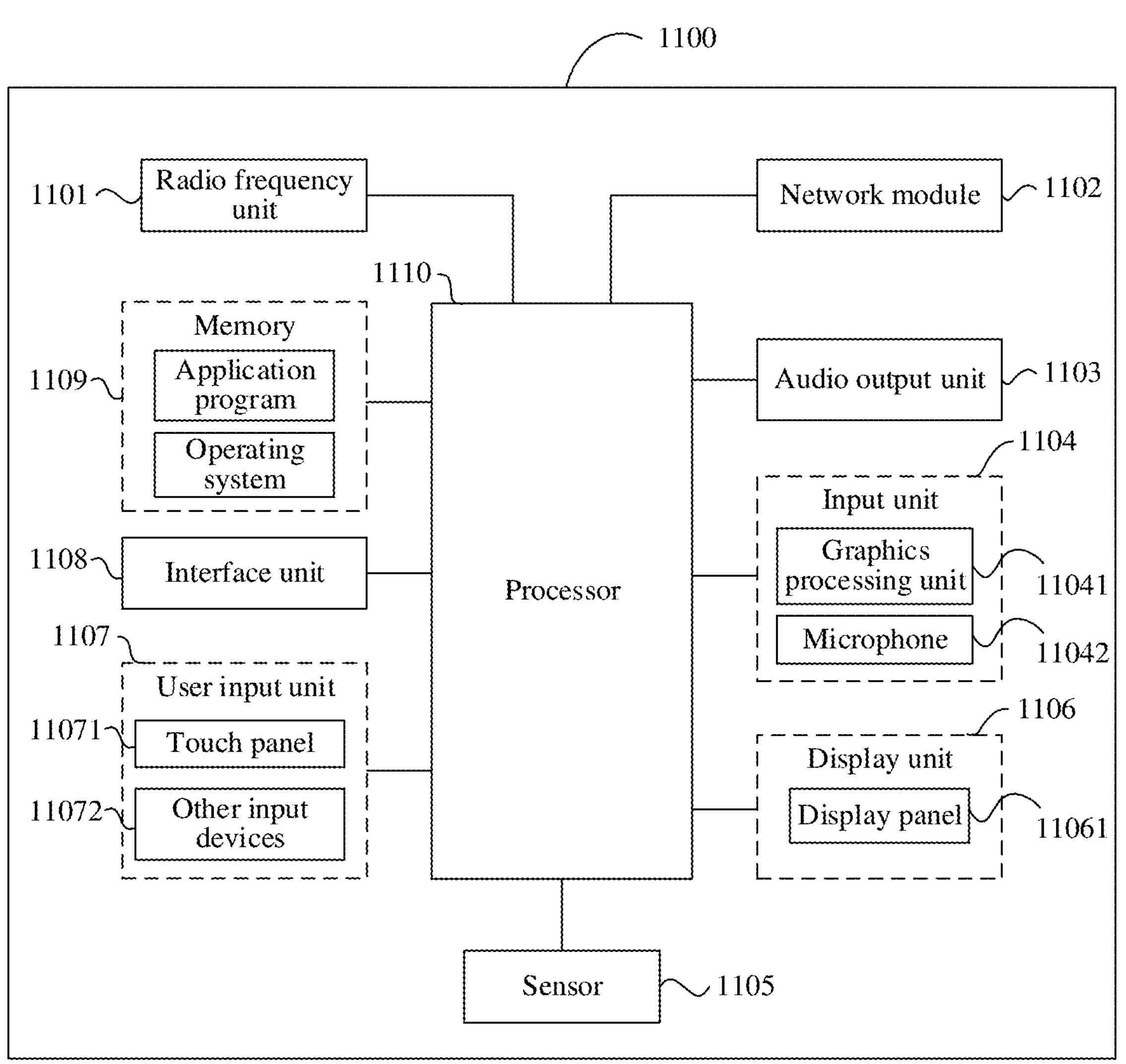
FIG. 11 is a schematic structural diagram of a terminal according to an example embodiment of this application.

An embodiment of this application further provides a terminal including a processor and a communication interface. The communication interface is coupled to the processor, and the processor is configured to run a program or instructions to implement steps of the method according to the method embodiment 700. This terminal embodiment corresponds to the foregoing method embodiment on the terminal side. All processes and implementations in the foregoing method embodiment can be applicable to this terminal embodiment, with the same technical effect achieved. Exemplarily, FIG. 11 is a schematic diagram of a hardware structure of a terminal for implementing embodiments of this application.

The terminal 1100 includes, but is not limited to, at least some of components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

Persons skilled in the art can understand that the terminal 1100 may further include a power supply (for example, a battery) for supplying power to the components. The power supply may be logically connected to the processor 1110 through a power management system. In this way, functions such as charge management, discharge management, and power consumption management are implemented by using the power management system. The structure of the terminal shown in FIG. 11 does not constitute any limitation on the terminal, and the terminal may include more or fewer components than shown in the figure, or combine some of the components, or have different arrangements of the components. Details are not described herein.

It should be understood that in this embodiment of this application, the input unit 1104 may include a graphics processing unit (Graphics Processing Unit, GPU) 1041 and a microphone 11042. The graphics processing unit 11041 processes image data of a static picture or a video that is obtained by an image capture apparatus (for example, a camera) in a video capture mode or an image capture mode. The display unit 1106 may include a display panel 11061. The display panel 11061 may be configured in a form of a liquid crystal display, an organic light-emitting diode display, or the like. The user input unit 1107 includes a touch panel 11071 and other input devices 11072. The touch panel 11071 is also referred to as a touchscreen. The touch panel 11071 may include two parts: a touch detection apparatus and a touch controller. The other input devices 11072 may include but is not limited to a physical keyboard, a function button (such as a volume control button or a power button), a trackball, a mouse, and a joystick. Details are not described now.

In this embodiment of this application, the radio frequency unit 1101 transmits downlink data received from a network-side device to the processor 1110 for processing, and in addition, transmits uplink data to the network-side device. Generally, the radio frequency unit 1101 includes but is not limited to an antenna, at least one amplifier, a transceiver, a coupler, a low noise amplifier, and a duplexer.

The memory 1109 may be configured to store software programs or instructions and various data. The memory 1109 may include a first storage area for storing a program or instruction and second storage area for storing data. The first storage area may store an operating system, an application program or instructions required by at least one function (for example, sound play function or image play function), or the like. In addition, the memory 1109 may include a volatile memory or a non-volatile memory, or the memory 1109 may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct rambus random access memory (DRRAM). The memory 1109 in the embodiments of this application includes but is not limited to these and any other suitable types of memories.

The processor 1110 may include one or more processing units. Optionally, the processor 1110 integrates an application processor and a modem processor. The application processor mainly processes operations related to operating systems, user interfaces, application programs, and the like. The modem processor mainly processes wireless communication signals, for example, being a baseband processor. It can be understood that the modem processor may alternatively be not integrated in the processor 1110.

The radio frequency unit 1101 is configured to receive a third sensing service control message sent by a first network element, where the third sensing service control message is used for establishing a first sensing service; and the processor 1110 is configured to perform measurement on a sensing signal based on the third sensing service control message to obtain at least one piece of sensing measurement data, where the sensing signal corresponds to the first sensing service; where the sensing signal measurement device sends the at least one piece of sensing measurement data to a radio access network (RAN).

Optionally, the third sensing service control message includes at least one of the following: part or all of policy information of sensing quality of service, used to indicate a sensing service-related resource and/or sensing execution policy allocated to the first sensing service; part or all of description information of the first sensing service; part or all of policy information of transmission quality of service applicable to the sensing signal measurement device; or first sensing session identification (SSID) information corresponding to the first sensing service.

Optionally, the policy information of sensing quality of service includes at least one of the following: sensing delay budget; sensing resolution; maximum sensing range; sensing error; continuous sensing capacity; sensing update rate; sensing security; sensing privacy; detection probability; false alarm probability; sensing priority level; or sensing signal quality.

Optionally, the radio frequency unit 1101 is further configured to send an SSID corresponding to each of the at least one piece of sensing measurement data, for use by the RAN to perform sensing measurement data association.

Optionally, the radio frequency unit 1101 is further configured to receive a second sensing service control message sent by the RAN, where the second sensing service control message is used for establishing a data channel between the RAN and the sensing signal measurement device; and establish a data channel between the RAN and the sensing signal measurement device based on the second sensing service control message; and the step of the third transmission module 1010 sending the at least one piece of sensing measurement data to a radio access network (RAN) includes: sending the at least one piece of sensing measurement data to the RAN through the data channel between the RAN and the sensing signal measurement device.

An embodiment of this application further provides a network-side device including a processor and a communication interface. The communication interface is coupled to the processor, and the processor is configured to run a program or instructions to implement steps of the method according to the embodiments 200 to 700. This network-side device embodiment corresponds to the foregoing network-side device method embodiment. All processes and implementations in the foregoing method embodiment can be applicable to this network-side device embodiment, with the same technical effect achieved.

Figure 12:
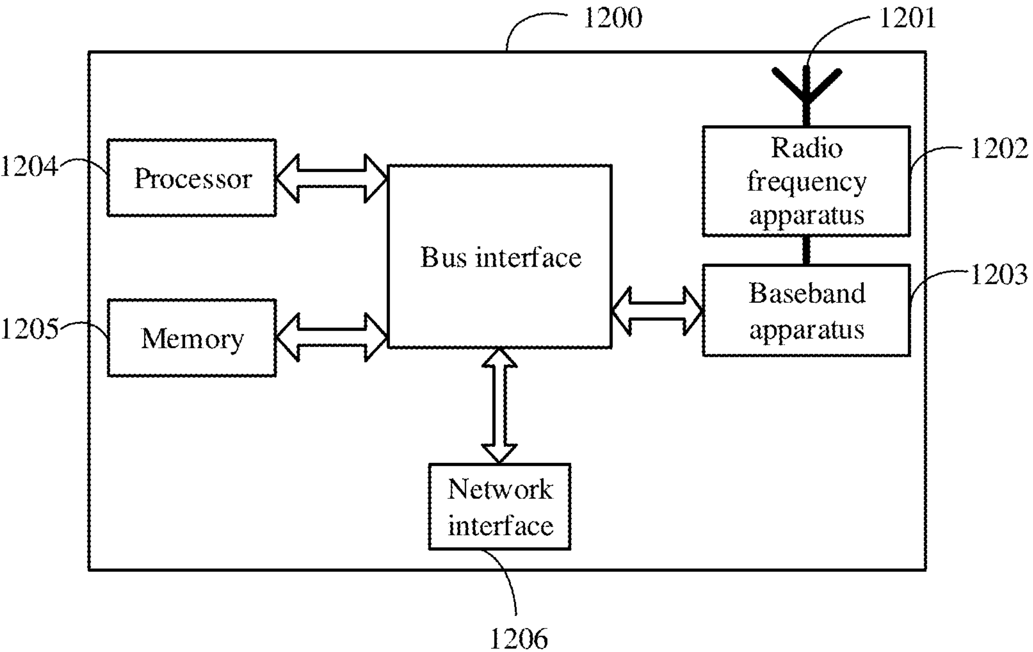
FIG. 12 is a schematic structural diagram of a network-side device according to an example embodiment of this application.

An embodiment of this application further provides a network-side device. As shown in FIG. 12, the network device 1200 includes an antenna 1201, a radio frequency apparatus 1202, and a baseband apparatus 1203, a processor 1204, and a memory 1205. The antenna 1201 is connected to the radio frequency apparatus 1202. In an uplink direction, the radio frequency apparatus 1202 receives information by using the antenna 1201, and transmits the received information to the baseband apparatus 1203 for processing. In a downlink direction, the baseband apparatus 1203 processes to-be-transmitted information, and transmits the information to the radio frequency apparatus 1202; and the radio frequency apparatus 1202 processes the received information and then transmits the information by using the antenna 1201.

The band processing apparatus may be located in the baseband apparatus 1203. The method performed by the network-side device in the foregoing embodiment may be implemented in the baseband apparatus 1203, and the baseband apparatus 1203 includes a processor 1204 and a memory 1205.

The baseband apparatus 1203 may include, for example, at least one baseband processing unit, where a plurality of chips are disposed on the baseband processing unit. As shown in FIG. 12, one of the chips is, for example, the processor 1204, and connected to the memory 1205, to invoke the program in the memory 1205 to perform the operations of the network device shown in the foregoing method embodiment.

The baseband apparatus 1203 may further include a network interface 1206, configured to exchange information with the radio frequency apparatus 1202, where the interface is, for example, a common public radio interface (CPRI).

Optionally, the network-side device in this embodiment of this application further includes instructions or a program stored in the memory 1205 and executable on the processor 1204. The processor 1204 invokes the instructions or program in the memory 1205 to execute the method executed by the modules shown in FIGS. 8 to 10, with the same technical effects achieved. To avoid repetition, details are not described herein again.

An embodiment of this application further provides a non-transitory readable storage medium, where the non-transitory readable storage medium stores a program or instructions, and when the program or instructions are executed by a processor, the processes of the foregoing data transmission method embodiments are implemented, with the same technical effects achieved. To avoid repetition, details are not described herein again.

The processor is a processor in the terminal described in the foregoing embodiment. The non-transitory readable storage medium includes a non-transitory computer-readable storage medium, for example, a computer read-only memory (Read-Only Memory, ROM).

An embodiment of this application further provides a chip. The chip includes a processor and a communication interface. The communication interface is coupled to the processor. The processor is configured to run a program or instructions for a network-side device, to implement the processes of the data transmission method embodiments, with the same technical effects achieved. To avoid repetition, details are not described herein again.

It should be understood that the chip mentioned in an embodiment of this application may also be referred to as a system-level chip, a system chip, a chip system, a system-on-chip, or the like.

An embodiment of this application further provides a computer program product. The computer program product includes a processor, a memory, and a program or instructions stored in the memory and executable on the processor. When the program or instructions are executed by the processor, the processes in the foregoing embodiments of the data transmission method are implemented, with the same technical effects achieved. To avoid repetition, details are not described herein again.

An embodiment of this application further provides a sensing service system including a terminal and a network-side device. The terminal may be configured to execute the steps of the method of the method embodiment 700, and the network-side device may be configured to execute the steps of the method of the method embodiments 200 to 700.

It should be noted that the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more constraints, an element preceded by "includes a . . . " does not preclude the presence of other identical elements in the process, method, article, or apparatus that includes the element. In addition, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

By means of the foregoing description of the implementations, persons skilled in the art may clearly understand that the method in the foregoing embodiment may be implemented by software with a necessary general hardware platform. Certainly, the method in the foregoing embodiment may also be implemented by hardware. However, in many cases, the former is a preferred implementation. Based on such an understanding, the technical solutions of this application essentially, or the part contributing to the prior art may be implemented in a form of a computer software product. The computer software product is stored in a non-transitory storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing embodiments. The foregoing embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A data transmission method, wherein the method comprises:

receiving, by a radio access network (RAN), a first sensing service control message sent by a first network element, wherein the first sensing service control message comprises at least tunnel information of the first network element; and establishing, by the RAN, a sensing service shared channel, wherein the sensing service shared channel corresponds to the tunnel information of the first network element, and the sensing service shared channel is used for transmitting at least one piece of sensing measurement data corresponding to a first sensing service;

wherein the tunnel information of the first network element comprises tunnel endpoint identification information of the first network element and/or address information of the first network element; wherein the method further comprises:

sending, by the RAN based on the first sensing service control message, a second sensing service control message to a sensing signal measurement device associated with a first sensing task; wherein the second sensing service control message is used for establishing a data channel between the RAN and the sensing signal measurement device.

2. The method according to claim 1, wherein the first sensing service control message further comprises at least one of the following:

policy information of sensing quality of service, used to indicate a sensing service-related resource and/or sensing execution policy allocated to the first sensing service;

policy information of transmission quality of service, used to indicate a communication transmission resource and/or communication transmission policy allocated to the first sensing service; description information of the first sensing service; or first sensing session identification (SSID) information corresponding to the first sensing service, wherein the first SSID corresponds to the sensing service shared channel.

3. The method according to claim 2, wherein the policy information of sensing quality of service comprises at least one piece of following information:

sensing delay budget; sensing resolution; maximum sensing range;

sensing error; continuous sensing capacity; sensing update rate; sensing security;

sensing privacy; detection probability; false alarm probability; sensing priority level; or sensing signal quality.

4. The method according to claim 2, wherein the establishing, by the RAN, a sensing service shared channel comprises:

establishing, by the RAN, the sensing service shared channel based on the policy information of sensing quality of service, wherein the sensing service shared channel transmits the sensing measurement data for the first sensing service according to the policy information of transmission quality of service.

5. The method according to claim 1, wherein the method further comprises:

sending, by the RAN, a first sensing service response message to the first network element, wherein the first sensing service response message is at least used to indicate to the first network element whether the sensing service shared channel has been successfully established.

6. The method according to claim 5, wherein the first sensing service response message comprises at least one of the following:

first indication information, used to indicate to the first network element whether the sensing service shared channel corresponding to the first sensing service has been successfully established; tunnel information of the RAN, wherein the tunnel information of the RAN comprises tunnel endpoint identification information of the RAN and/or address information of the RAN; or second indication information, used to indicate to the first network element whether the first sensing service has been accepted or successfully executed.

7. The method according to claim 1, wherein the method further comprises:

obtaining, by the RAN, at least one piece of sensing measurement data; and sending, by the RAN, sensing measurement data, associated with the first SSID, in the at least one piece of sensing measurement data to the first network element through the sensing service shared channel.

8. The method according to claim 7, wherein the obtaining, by the RAN, at least one piece of sensing measurement data comprises at least one of the following:

performing, by the RAN, measurement on a received sensing signal sent by at least one sensing signal sending device to obtain the at least one piece of sensing measurement data; or receiving, by the RAN, at least one piece of sensing measurement data sent by at least one sensing signal measurement device, wherein the at least one piece of sensing measurement data is obtained by the at least one sensing signal measurement device through measurement on a sensing signal.

9. The method according to claim 7, wherein the method further comprises:

obtaining, by the RAN, an SSID corresponding to each piece of the sensing measurement data; and determining, by the RAN based on whether the SSID corresponding to each piece of the sensing measurement data matches the first SSID, whether each piece of the sensing measurement data is associated with the first SSID;

wherein the obtaining, by the RAN, an SSID corresponding to each piece of the sensing measurement data comprises at least one of the following:

receiving, by the RAN, an SSID corresponding to each piece of the sensing measurement data and sent by the at least one sensing signal measurement device; or obtaining, by the RAN based on an identifier of the at least one sensing signal measurement device and/or identification information of an RAN tunnel, an SSID corresponding to each piece of the sensing measurement data.

10. The method according to claim 1, wherein the second sensing service control message comprises at least one of the following:

the first SSID; part or all of the policy information of sensing quality of service;

part or all of description information of the first sensing service; or part or all of policy information of transmission quality of service applicable to the sensing signal measurement device.

11. A network-side device, comprising a processor and a memory, wherein the memory stores a program or instructions executable on the processor, and when the program or instructions are executed by the processor, the steps of the data transmission method according to claim 1 are implemented.

12. A data transmission method, wherein the method comprises:

in a case that a sensing service request message is received from a consumer device, sending, by a first network element, a first sensing service control message to a radio access network (RAN) according to the sensing service request message, wherein the first sensing service control message comprises at least tunnel information of the first network element; wherein the first sensing service control message is used to instruct the RAN to establish a sensing service shared channel, wherein the sensing service shared channel corresponds to the tunnel information of the first network element, and the sensing service shared channel is used for transmitting at least one piece of sensing measurement data corresponding to a first sensing service;

wherein the tunnel information of the first network element comprises tunnel endpoint identification information of the first network element and/or address information of the first network element; wherein the RAN transmits, based on the first sensing service control message, a second sensing service control message to a sensing signal measurement device associated with a first sensing task, wherein the second sensing service control message is used for establishing a data channel between the RAN and the sensing signal measurement device.

13. The method according to claim 12, wherein the method further comprises:

obtaining, by the first network element, target policy information corresponding to the first sensing service in response to the sensing service request message, wherein the target policy information comprises policy information of sensing quality of service and/or policy information of transmission quality of service.

14. The method according to claim 13, wherein the obtaining, by the first network element, target policy information comprises at least one of the following: sending, by the first network element, a policy request message to a policy control function (PCF) to obtain the target policy information from the PCF; and generating, by the first network element, the target policy information;

wherein the policy request message comprises at least one of the following:

description information of the first sensing service; target area of the first sensing service; information about a target user of the first sensing service; or identification information of a sensing device, wherein the sensing device comprises a sensing signal sending device and/or the sensing signal measurement device.

15. A network-side device, comprising a processor and a memory, wherein the memory stores a program or instructions executable on the processor, and when the program or instructions are executed by the processor, the steps of the data transmission method according to claim 12 are implemented.

16. A data transmission method, wherein the method comprises:

receiving, by a sensing signal measurement device, a third sensing service control message sent by a first network element, wherein the third sensing service control message is used for establishing a first sensing service, and the first network element transmits a first sensing service control message comprising at least tunnel information of the first network element to a radio access device (RAN), the tunnel information of the first network element comprising tunnel endpoint identification information of the first network element and/or address information of the first network element;

performing, by the sensing signal measurement device, measurement on a sensing signal based on the third sensing service control message to obtain at least one piece of sensing measurement data, wherein the sensing signal corresponds to the first sensing service; and sending, by the sensing signal measurement device, the at least one piece of sensing measurement data to a radio access network (RAN);

wherein the method further comprises: receiving, by the sensing signal measurement device, a second sensing service control message sent by the RAN, wherein the second sensing service control message is used for establishing a data channel between the RAN and the sensing signal measurement device.

17. A terminal, comprising a processor and a memory, wherein the memory stores a program or instructions executable on the processor, and when the program or instructions are executed by the processor, the steps of the data transmission method according to claim 16 are implemented.

18. A network-side device, comprising a processor and a memory, wherein the memory stores a program or instructions executable on the processor, and when the program or instructions are executed by the processor, the steps of the data transmission method according to claim 16 are implemented.

19. The method according to claim 16, wherein the third sensing service control message comprises at least one of the following: part or all of policy information of sensing quality of service, used to indicate a sensing service-related resource and/or sensing execution policy allocated to the first sensing service; part or all of description information of the first sensing service; part or all of policy information of transmission quality of service applicable to the sensing signal measurement device; and a first sensing session identifier (SSID) corresponding to the first sensing service.

20. The method according to claim 19, wherein the policy information of sensing quality of service comprises at least one piece of following information:

sensing delay budget; sensing resolution; maximum sensing range; sensing error;

continuous sensing capacity; sensing update rate; sensing security; sensing privacy;

detection probability; false alarm probability; sensing priority level; or sensing signal quality.

* * * * *